United States Patent [19]

Bouheben

[11] Patent Number: 5,056,926
[45] Date of Patent: Oct. 15, 1991

[54] APPARATUS FOR TREATING A PARTICULATE THERMOPLASTIC MATERIAL WITH A PURGING GAS

[75] Inventor: Guy Bouheben, 41 avenue du mai 1945, 69500 Bron, France

[73] Assignees: Guy Bouheben; Christophe Bouheben, both of Bron; Carole Giambrone, Lissieu-Lozan, all of France

[21] Appl. No.: 543,715
[22] PCT Filed: Nov. 28, 1989
[86] PCT No.: PCT/FR89/00611
§ 371 Date: Jul. 19, 1990
§ 102(e) Date: Jul. 19, 1990
[87] PCT Pub. No.: WO96/06173
PCT Pub. Date: Jun. 14, 1990

[30] Foreign Application Priority Data
Dec. 9, 1988 [FR] France ............... 88 16510

[51] Int. Cl.[5] .............................................. B01F 7/20
[52] U.S. Cl. .................................. 366/102; 366/314; 366/343
[58] Field of Search ............ 366/102, 144, 149, 279, 366/314, 196, 343

[56] References Cited

U.S. PATENT DOCUMENTS

| | | | |
|---|---|---|---|
| 1,536,203 | 5/1925 | Frydenlund | 366/314 |
| 3,884,135 | 5/1975 | Lohr | 366/144 |
| 4,070,957 | 1/1978 | Kovekawa | 366/279 |
| 4,201,482 | 5/1980 | Imhauser | 366/279 |

FOREIGN PATENT DOCUMENTS 1027966  7/1958  Fed. Rep. of Germany ...... 366/102

Primary Examiner—Harvey C. Hornsby
Assistant Examiner—Terrence R. Till
Attorney, Agent, or Firm—Sughrue, Mion, Zinn, Macpeak & Seas

[57] ABSTRACT

The invention relates to an apparatus for treating a particulate thermoplastic material.

This apparatus comprises a container (1) divided internally by a perforated partition (12) which serves as a passage for a purging gas. A suitable rotor (6) provided with blades (10) and (11) allows the treated charge to be maintained temporarily at a distance from the stationary and rotating internal walls of the apparatus.

The invention applies especially to the coloring of particulate plastic materials by coating.

10 Claims, 2 Drawing Sheets

APPARATUS FOR TREATING A PARTICULATE THERMOPLASTIC MATERIAL WITH A PURGING GAS

The present invention relates to the treatment of a particulate thermoplastic material with a purging gas.

A "thermoplastic material" is intended to mean any organic polymer or copolymer which is solid at room temperature and capable of being made relatively fluid by heating to a temperature above room temperature. As a thermoplastic material which can be chosen according to the invention there may be mentioned polystyrenes, polyethylenes, polypropylenes and so-called ABS resins.

A "particulate thermoplastic material" is intended to mean a thermoplastic material in the divided state, which is in the form of particles, for example of grains, granules or pearls, which have any individual shape, for example spherical, cubical, and the like. A powder of a thermoplastic material or a pulverulent thermoplastic material corresponding [sic]especially to this definition.

The present invention is now described, defined and discussed with reference to the use of the process of coloring by coating according to Patent Application FR-A-2,317,069; the content of the latter is incorporated into the present description as far as need be. It should be understood, however, that an apparatus according to the invention can accommodate many applications other than coloring by coating, as indicated hereinafter.

According to the abovementioned patent application, a process of coloring by coating has been described, consisting generally in:

agitating a charge of particulate thermoplastic material;

mixing with this charge a coloring liquid comprising an inert solvent, a colorant in suspension or solution in the said solvent, and a binder dissolved in the said solvent;

evaporating the solvent by circulating a purging gas stream through the charge, during or after the agitation of the latter; whereby particles of thermoplastic material are obtained, which are coated with a surface coating of the binder in which the colorant is uniformly dispersed.

A suitable apparatus for making use of the abovementioned process has been described and proposed in Patent Application FR-A-2,317,069. This apparatus comprised:

A) a stationary container for receiving a charge of the particulate thermoplastic material, whose side wall has a shape of revolution, for example cylindrical, relative to a vertical axis; this container is equipped with a means for introducing the charge to be colored, namely an articulated cover, with a means for discharging the colored charge, for example a spout situated at the bottom of the container, and with a means for circulating the purging gas stream through the container; the latter means comprises, on the one hand, a means for introducing air (or another gas) within the agitating rotor described below and, on the other hand, a means for removing by suction the gas stream which is introduced, arranged on the cover.

B) a rotor for agitating the charge, movable in rotation relative to the container and around the vertical axis, and arranged essentially inside the said container; this rotor comprises:

a hollow axial shaft for introducing the purging air and provided with a means for driving in rotation; this hollow shaft passes through the bottom of the container and the means for driving in rotation is situated outside the latter;

three hollow blades for upward centripetal flow, whose interior communicates with that of the axial shaft; each blade comprises, on the one hand, a radial arm extending radially and horizontally from the axial shaft, in the lower part of the container, and, on the other hand, a vertical upright extending axially and vertically inside the container; each blade is provided, on the one hand, with a front face, namely a face sloping forward in the case of the radial arm, and a face which is oblique toward the center of the receptacle in the case of the vertical upright, respectively, and, on the other hand, a perforated back face for injecting the purging air.

The utilization of an apparatus such as that described above for making use of the coloring process defined above has disclosed the following chief disadvantages.

It appears difficult to maintain the charge which is being colored continually at a distance from the walls of the container, be it from the bottom or from the side wall of the latter. Consequently, a not insignificant quantity of the solids content of the liquid coloring material, namely colorant and binder, coats the walls of the treatment container, to the detriment of the effective coloring of the particles of thermoplastic material. Between two coloring treatments this results in a considerable period of immobilization, devoted to the complete cleaning of the container, which is found, furthermore, to be difficult and tedious. This also results in a random coating of the particles of the thermoplastic material, and one which is in any case lower in the quantity of colorant deposited than the value expected in the case of a complete coloring of the charge.

As a result of the movement of the particles which are colored or being colored on the front face of the blades of the agitation rotor, a deposit of the colorant and of the binder is also found on the rotor. This deposit produces the same consequences as those listed above.

As a final outcome, for all these reasons, a coloring of the particles is obtained which is not fully controlled and therefore random between one charge and another. Furthermore, an apparatus such as this results in difficulties in industrial use because of the extensive cleaning which it demands between two coloring treatments. This cleaning does not allow an optimum economic use, bearing in mind the considerable immobilization periods required.

The subject of the present invention is an apparatus such as that defined above, permitting, when it is employed for a coloring operation using coating, a virtually complete deposition of the colorant introduced into the container, on the particles of the charge of the thermoplastic material which is treated.

First of all, according to the invention, each of the flow blades has an edge for picking up the particles of the thermoplastic material, or leading edge, situated at least partly or even wholly at a certain distance from the opposing internal surface. This distance will be a function of the size of the unit particles. A distance of between 5 and 15 mm is suitable for the majority of existing products.

While the liquid coloring material is being introduced and distributed within the particulate charge which is treated, this characteristic enables a temporary barrier to be created between the agitating rotor and the opposing internal surface, especially the side wall of the container, this barrier being constituted by at least two laminar thicknesses of the treated particles in motion. As a result of the relative distance between the rotor and the opposing surface, the temporary barrier obtained allows the charge being colored to be isolated from the walls of the treatment container, at least during the coloring stage.

These walls are thus protected against any color interference.

Next, still according to the invention, the front face of at least one flow blade, namely of the radial arm and/or of the vertical upright, comprises a plurality of surface cavities adjoining one another, for temporary retention of the particles of the charge which are being conveyed while the latter is being treated.

According to the invention it has, in fact, been found that the relative immobilization of the treated particles in relation to the front face of the agitating rotor greatly reduced the deposition of the solid content of the liquid coloring material on this latter rotor.

To end with, still according to the invention, the treatment container comprises a lower partition extending radially and permeable to the purging gas stream, ensuring ventilation of the treated charge. This partition divides the container into two compartments, namely a main, upper treatment compartment, and a lower compartment for introducing the purging gas stream.

According to this characteristic, and in contrast to the apparatus according to Patent Application FR-A-2,317,069, on the one hand the purging gas stream is introduced wholly via the bottom of the container or vessel, and upwards, and, on the other hand, the agitating rotor, even though it may remain hollow, is not used for introducing all or part of the same gas stream.

This particular ventilation arrangement enables the purging gas stream temperature to be controlled and allows it to be fed by a turbine, which could not be done with the arrangement according to Patent Application FR-A-2,317,069.

The present invention is now described with reference to the attached drawings, in which.

Figure 1:
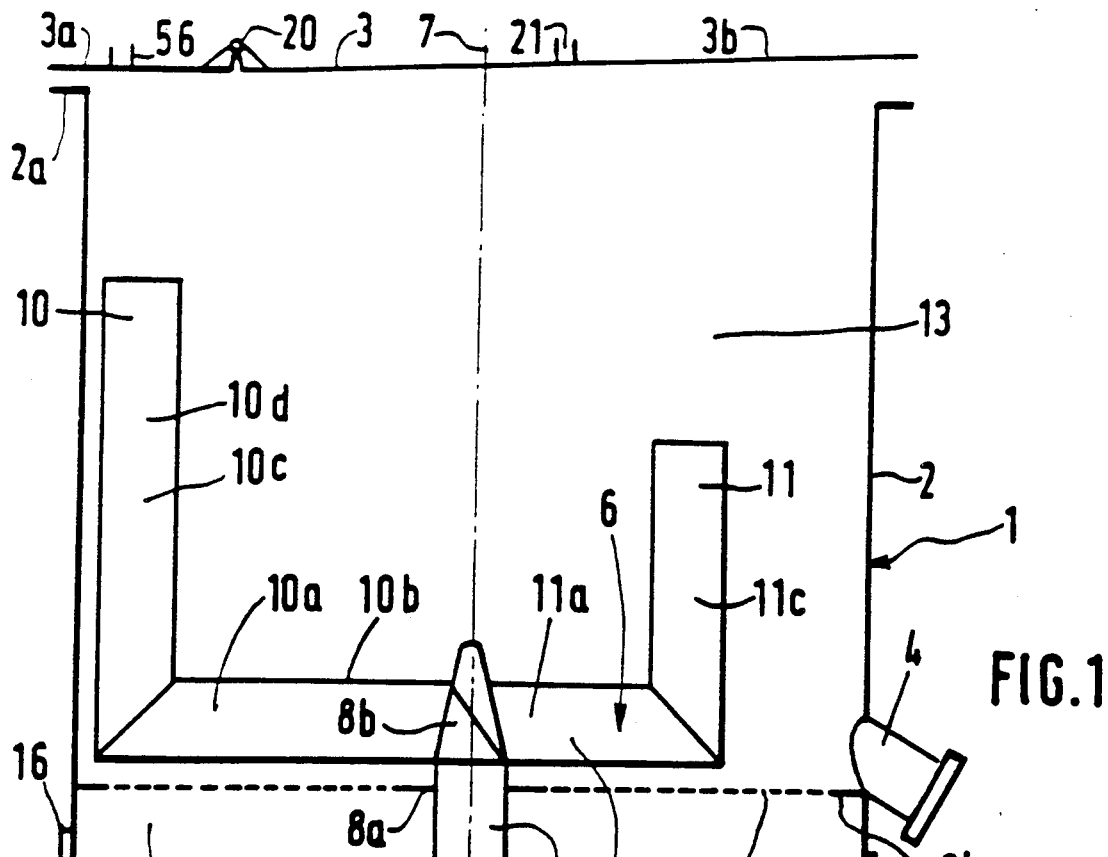
FIG. 1 shows a diagrammatic view, in axial section, of a treatment apparatus in accordance with the invention.
Figure 2:
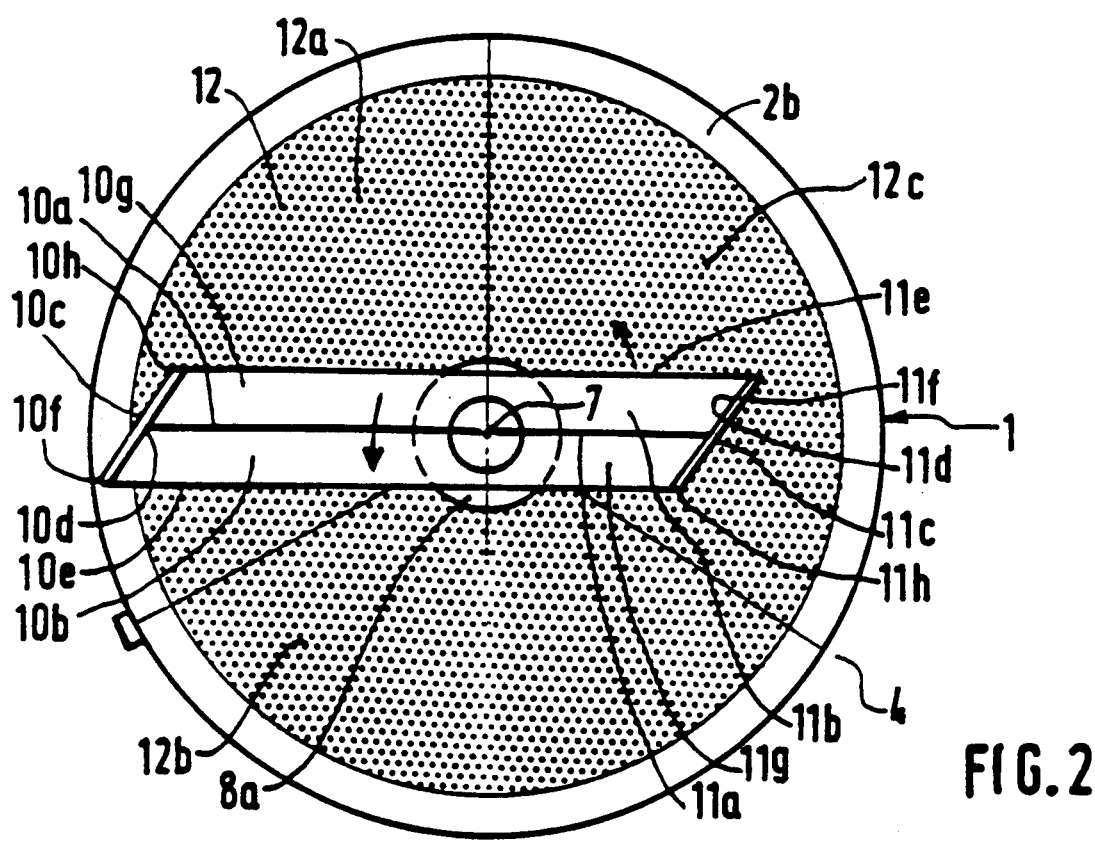
FIG. 2 shows, still diagrammatically, a top view of the apparatus shown in FIG. 1.

The apparatus shown in FIGS. 1 to 3 permits the treatment of a charge of a particulate thermoplastic material, and more precisely for coloring the particles of the abovementioned material by coating; it being understood that the same apparatus can be used for purposes other than this coloring, as described hereinafter. Furthermore, in the embodiment described below, the apparatus comprises two blades, but it is obvious that this is not limiting and that it would also be possible to produce units of apparatus in accordance with the invention comprising a larger number of blades.

In general, an apparatus according to the invention comprises:

a stationary container (1) in the form of a cylindrical vessel, for receiving a charge of the particulate material;

a rotor (6) for agitating the charge, arranged essentially within the container (1), movable in rotation in relation to the latter and around the vertical axis (7) of the container.

The container (1) is equipped with a means or cover (3) for introducing the charge to be treated, resting on the annular flange (2a) of the vessel or container (2). This cover comprises a stationary part (3a) and a movable part (3b) articulated to the stationary part by a hinge (20). Furthermore, the cover (3) comprises an orifice (56) for discharging the purging gas stream, using the action of a suction turbine which is not shown, and an orifice (21) for introducing a liquid coloring matter consisting, as described above, of a mixture of a solvent, a colorant and a soluble binding agent.

The container (1) comprises a perforated lower partition (12), extending radially, consisting of three perforated sectors (12a, 12b, 12c), each resting, on the outer side, on a circular internal shoulder (2b) belonging to the cylindrical wall (2), and, on the inner side, on a circular shoulder (8a) integrally attached to the axial shaft (8), which will be discussed hereinafter.

This partition (12) divides the container (1) into two compartments, namely a main upper compartment (13) for treating the particulate charge, and a lower compartment (14) for introducing the purging gas stream. The latter is introduced into the lower compartment through an orifice (5) provided at the bottom of the cylindrical wall (2). As described hereinafter, the purging gas stream introduced into the compartment (14) passes through the permeable partition (12) and ensures an upward ventilation of the treated charge, which is available in the upper compartment (13).

The agitating rotor (6) comprises:

an axial shaft (8) passing right through the compartment (14) for introducing the gas stream, and more precisely the bottom (15) of the container (1), which will be discussed later, and the preferred partition (12);

an agitator in the true sense, comprising two blades (10) and (11) for upward centripetal flow, which are constructed as a single unit and included substantially in the same diametral plane.

More precisely, the agitator (10, 11) can be removed in relation to the axial shaft (8), the latter comprising a conical part (8b) situated inside the main compartment (13) and equipped with a system for self-locking integration under the effect of the rotation of the rotor (6). Outside the container (2), the axial shaft (8) is provided with a means (9), such as a pulley, to allow it to be driven in rotation by a suitable driving means.

Each blade (10) or (11) generally comprises, on the one hand, a radial arm (10a) or (11a) extending radially and horizontally from the shaft (8) toward the wall (2) in the lower part of the vessel (1) and, on the other hand, a vertical upright (10c) or (11c) extending vertically within the container (2), from a corresponding radial arm (10a) or (11a) toward the cover (3). The vertical upright (10c) of the first blade (10) has a height substantially equal to two thirds of the height of the treatment container (13), while the vertical upright (11c) of the second blade (11) has a height substantially equal to two thirds of the height of the vertical upright (10c) of the first blade. The radial arm (11a) of the second blade (11) has a length substantially equal to two thirds of the radius of the treatment compartment (13) or container.

Each radial arm (10a) or (11a) comprises, on the one hand, a front face (10b) or (11b) (depending on the direction of rotation), sloping forward and, on the other hand, a back face (10g) or (11g) sloping in the reverse direction. Each front face (10b) or (11b) therefore extends in height from a lower edge (10e) or (11e) for picking up the particles of the treated charge, to a trailing edge, not given a reference. The lower edge (10e) or (11e) of the radial arms, which is situated in the same single transverse plane is preferably situated at a distance from the lower partition (12) which is preferably equal to 15 mm.

Each vertical upright (10c) or (11c) comprises a front face (10d) or (11d) (depending on the direction of rotation), directed obliquely towards the center of the vessel (1). Each front face (10d) or (11d) therefore extends from an outer pick-up edge (10f) or (11f) towards an inner releasing edge (10h) or (11h). The outer edge (10f) belonging to the vertical upright (10c) of the first flow blade (10) is preferably situated at a distance from the side wall (2) of the container (1) which is in the present case equal to 10 mm but which could, in general, vary between 5 and 15 mm as a function of the particle size.

Figure 3:
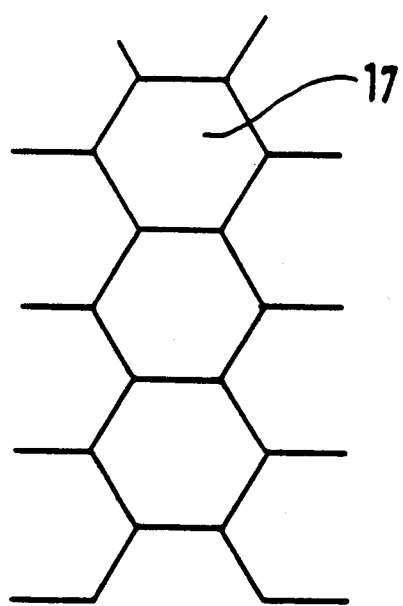
FIG. 3 shows a partial view of the front face of a blade belonging to the rotor of the apparatus shown in FIGS. 1 and 2, whose cellular structure is finished.

According to FIG. 3, the front face (10d) or (11d) of the vertical upright (10c) or (11c) of the blade (10) or (11) comprises a plurality of surface cavities (17) adjoining one another, which are in the shape of a cellular surface of the honeycomb type. These surface cavities (17) are obtained by machining, by drilling several aligned and parallel series of blind holes which have the same diameter, for example with the same drill. These series fit into each other by virtue of the offset which has the value of a radius of one series relative to that immediately neighboring. Each of the blind holes thus obtained is then redrilled with a drill of wider diameter so as to obtain a hexagonal external outline in accordance with FIG. 3. As explained hereinafter, this cellular surface which is thus obtained permits a temporary retention of the conveyed particles of the treated charge while the latter is being treated.

An example of use of an apparatus in accordance with FIGS. 1 to 3, allowing granules of ABS resin to be colored by coating, is described below.

The container or vessel (1) is filled with a charge of the particulate thermoplastic material to be colored, representing approximately 35% of the working capacity of the upper treatment compartment (13), this capacity being expressed in kilograms. For example, the upper compartment (13) receives a 500-kilogram charge. The movable part (3b) of the cover (3) is closed again, the agitating rotor (6), set in rotation, is adjusted to a slow speed, of the order of 10 revolutions per minute. A blowing turbine is connected to the air injection orifice (5) at the bottom of the lower compartment (14). The output air passes through the perforated wall (12) and ventilates the mass of granules present in the compartment (13), agitated by the rotor (6). A suction turbine is connected to the discharge outlet (56), and this allows the inside of the vessel (2) to be put under negative pressure, and produces a forced extraction of the purging gas stream. The liquid coloring matter is introduced into the container (2) through the entry orifice (21) according to a sequence determined by a programmer. This sequence may be, for example, as follows:

from 3 to 5 seconds: injection of the liquid coloring matter;
from 30 to 40 seconds: distribution of the coloring matter, evaporation and fixing of the solid content;
from 3 to 5 seconds: new injection of the liquid coloring matter;
from 30 to 40 seconds: evaporation and fixing of the solid content;
and so on;
from 3 to 5 minutes: final evaporation with a stream of hot air at 70° C.;
opening of the discharge spout (4).

A coloring cycle of this kind can on average take 20 minutes and can represent an output of the order of 1,500 kilograms per hour in the case of an apparatus which has a diameter of the order of 1.4 meters.

At the end of the operation described above, that is at the end of the coloring cycle, all the internal parts of the apparatus remain clean, and in particular the inner face of the wall (2) and the blades (10) and (11) of the agitating rotor (6). Only a slight coloring of these internal parts is observed, and this is easy to clean in a very short time.

With an apparatus such as that described above it is therefore easy to change both the treated material and the coloring matter.

Between two different treatments, such as changing the matter to be treated or the color to be produced, the apparatus described above is subjected, in a very short time and with ease, to the following preparation:

by virtue of the sloping bottom (15), the fines which may or may not be generated by the attrition of the particulate material treated previously and which has passed through the perforated partition (12) are blown out by the stream of air introduced through the orifice (5) and are recovered via the orifice or trap door (16);

the single-unit agitator consisting of the blades (10) and (11) is removed from the central shaft (8) and cleaned with an aliphatic solvent;

the inner surface of the wall (2) and the perforated wall (12) are cleaned with a solvent-moistened paper wipe.

A preparation stage of this kind immobilizes the apparatus only for a limited time, for example of the order of 20 minutes.

Bearing in mind the virtual absence of contamination obtained according to the invention, it is possible to utilize virtually all of the coloring substance introduced into the apparatus to coat the particulate material which is treated. Yields of coloring substance which are close to 100% are therefore obtained.

Various specific advantages resulting from the following technical characteristics are detailed below.

The perforated partition (12) in the form of three removable perforated segments (12a, 12b, 12c) allows a careful and rapid inspection and maintenance of the apparatus.

The slope of the front faces (10b) and (11b) of the rotor arms and the slope of the front faces (10d) and (11d) of the vertical uprights of the rotor, of the order of 30 to 40°, permit a centripetal and upward movement of the treated charge in an optimum manner.

The relative and particular dimensioning of the blades (10) and (11) described above, consisting, on the one hand, in shortening the radial arm (11a) and, on the other hand, in shortening the vertical upright (11c) relative to the vertical upright (10c) allows the treated mass to be destabilized and dissociated, when the latter aggregates in the form of a block, which is the case, for example, with cubic granules.

The speed of rotation of the rotor (6), chosen to be relatively slow, between 8 and 20 revolutions/mm [sic], causes little depression within the treated mass, for example in the form of a vortex.

According to an alternative form of the apparatus in accordance with the invention, it is possible to envisage modifying the system for driving the axial shaft (8) such as that described above, by using an external motor system installed on a jib. In an alternative form of this kind the agitating rotor (6) is lowered into the container (1) by means of an axial control shaft connected to this motor system. Compared to the solution described above, this alternative form makes it possible to lift the rotor easily, especially when it is desired to maintain it, because this then provides rapid and direct access to the inside of the wall (2) and to the perforated partition (12). Furthermore, this solution avoids passing through the bottom (15) of the container (1) and of the perforated partition (12), and therefore simplifies the construction of the whole apparatus. Refitting and positioning of the rotor is then performed simply and accurately.

The apparatus described above can be employed for any treatment other than coloring by coating, for example drying a particulate plastic material, or regenerating a particulate plastic material colored by coating.

The use of the same apparatus for a regeneration, for example, is described hereinafter.

In the case of an application of this kind, an appropriate solvent is introduced or sprayed through the orifice (21). The orifice (56), for its part, is used for introducing air or nitrogen. The orifice (16), for its part, is used for recovering the solvent.

A regeneration operation can then be accomplished in the following manner:

a) during the cleaning stage the solvent is introduced and sprayed through the orifice (21) and a stream of nitrogen is introduced through the orifice (56); after preliminary wetting, the particles are stirred by the agitator (6); the solvent carrying pigments is recovered through the orifice (5);

b) the treated charge is rinsed using a continued and uninterrupted spraying of the solvent;

c) the particulate matter is dried and the residual solvent is recovered by the entry of hot air through the orifice (56), in conjunction with the suction by a turbine connected to the orifice (16).

I claim:

1. In an apparatus for treating a particulate thermoplastic material with a purging gas, comprising:
   A) a stationary container (1) for receiving a charge of a material, a side wall (2) of a shape of revolution relative to an axis (7), equipped with a means (3) for introducing the charge to be treated, a means (4) for discharging the treated charge, and a means (5, 56) for circulating a purging gas through the container,
   B) a rotor (6) for agitating the charge, movable in rotation relative to the container and around the said axis, arranged essentially inside the said container, comprising:
      an axial shaft (8) provided with a means (9) for driving in rotation;
      at least two blades (10, 11) for upward centripetal flow, each blade comprising, on the one hand, a radial arm (10a, 11a) extending radially and horizontally from the said shaft in the lower part of the container, provided with a front face (10b, 11b) (depending on the direction of rotation) sloping forward and, on the other hand, a vertical upright (10c, 11c) extending vertically inside the container, provided with a front face (10d, 11d) (depending on the direction of rotation) which is oblique toward the center,
   wherein:
      each of the flow blades (10, 11) is solid and has an edge (10e, 11e, 10f) for picking up the particles of the thermoplastic material, situated at least partly at a certain distance from the opposing internal surface (12, 1);
      the container further comprises a lower partition (12) extending radially beneath said flow blade and permeable to the purging gas stream, ensuring ventilation of the treated charge, the said partition dividing the container into two compartments, namely a main, upper treatment compartment (13), and lower compartment (14) for introducing the gas stream;
      and the front face (10b, 10d, 11b, 11c) of at least one flow blade (10, 11) in a direction of blade rotation, namely at least one of the radial arm (10a, 11a) and the vertical upright (10c, 11c) comprises a plurality of closed surface cavities (17) adjoining one another, for temporary retention of the conveyed particles of the charge while the latter is being treated.

2. Apparatus according to claim 1, wherein the lower edge (10e, 11e) for picking up the particles of the thermoplastic material, belonging to the radial arm (10a, 11a) of at least one flow blade (10, 11) is situated at a distance of between 5 and 15 mm from the lower partition (12).

3. Apparatus according to claim 1, wherein the lower edge (10f) for picking up the particles of the thermoplastic material, belonging to the vertical upright (10c) of at least one flow blade (10) is situated at a distance of between 5 and 15 mm from the side wall (2) of the container.

4. Apparatus according to claim 1, wherein the axial shaft (8) passes right through the compartment (14) for introducing the gas stream.

5. Apparatus according to claim 1, wherein the two blades (10, 11) for upward centripetal flow are unitary and constitute a single-unit agitator and are included substantially within the same diametral plane, and the radial arms (10a, 11a) of the two blades respectively are substantially aligned.

6. Apparatus according to claim 5, wherein the agitator (10, 11) is removably mounted to the axial driving shaft (8).

7. Apparatus according to claim 1, wherein the container comprises a bottom (15) spaced from said partition and sloping relative to the lower partition (14) and a side trap door (16) is provided in said container level with said sloping bottom for access to the compartment (14) for removing fines passing through said partition and said purging gas circulating means comprises an orifice (5) diametrically opposite said side trap door in said container for introducing the gas stream, situated at a low part of the sloping bottom.

8. Apparatus according to claim 1, wherein the vertical upright (10c) of a first blade (10) has a height substantially equal to two thirds of the height of the treatment compartment (13) and the vertical upright (11c) of a second blade (11) has a height substantially equal to two thirds of the height of the vertical upright (10c) of the first blade (10).

9. Apparatus according to claim 1, wherein the radial arm (11a) of one blade (11) has a length substantially equal to two thirds of the radius of the container (1).

10. Apparatus according to claim 1, wherein said plurality of closed surface cavities form on said front face define a cellular surface of the honeycomb type.

* * * * *